(12) United States Patent
Ashworth et al.

(10) Patent No.: US 7,667,163 B2
(45) Date of Patent: Feb. 23, 2010

(54) THERMOSTAT WITH ADJUSTABLE COLOR FOR AESTHETICS AND READABILITY

(75) Inventors: Nicholas Ashworth, Dublin, OH (US); Grace Yoder, Plain City, OH (US)

(73) Assignee: Ranco Incorporated of Delaware, Wilmington, DE (US)

( * ) Notice: Subject to any disclaimer, the term of this patent is extended or adjusted under 35 U.S.C. 154(b) by 209 days.

(21) Appl. No.: 11/483,923

(22) Filed: Jul. 10, 2006

(65) Prior Publication Data
US 2008/0006709 A1   Jan. 10, 2008

(51) Int. Cl.
*H05B 1/02* (2006.01)
(52) U.S. Cl. .................. 219/502; 219/506; 219/492; 219/491
(58) Field of Classification Search .......... 219/494, 219/502, 506, 490, 491
See application file for complete search history.

(56) References Cited

U.S. PATENT DOCUMENTS

| | | | |
|---|---|---|---|
| 4,208,869 A | 6/1980 | Hanaoka | |
| 4,355,347 A | 10/1982 | Guthrie | |
| 4,775,964 A | 10/1988 | Alessio et al. | |
| 5,343,712 A | 9/1994 | Gowan | |
| 5,400,852 A | 3/1995 | Nakae et al. | |
| 5,689,317 A | 11/1997 | Miller | |
| 6,152,375 A | 11/2000 | Robison | |
| 6,206,295 B1 * | 3/2001 | LaCoste | 236/94 |
| 6,726,112 B1 | 4/2004 | Ho | |
| 7,188,002 B2 | 3/2007 | Chapman, Jr. et al. | |
| 7,287,709 B2 * | 10/2007 | Proffitt et al. | 236/94 |
| 2004/0245352 A1 | 12/2004 | Smith | |

(Continued)

FOREIGN PATENT DOCUMENTS

CA    2598405    2/2008

(Continued)

OTHER PUBLICATIONS

Article entitled: "*LED Backlights Boost LCD TV Color*" retrieved from http://www.neasia.nikkeibp.com/neasia/000503 on Mar. 10, 2006, (Mar. 2005) Nikkei Electronics Asia (5 pages).

(Continued)

*Primary Examiner*—Mark H Paschall
(74) *Attorney, Agent, or Firm*—Leydig, Voit & Mayer, Ltd.

(57) ABSTRACT

The thermostat includes a housing having at least a portion thereof illuminated by a light that changes color via a manual input. The light illuminates the display for easy readability while the variable color of the light allows a user to match the appearance of the thermostat to best complement the surrounding décor. User input elements provide for the manual adjustment of one or more characteristics of the light, such as visible color of the light. The light source comprises at least one LED for displaying a plurality of colors. In this case, to change the color of the light illuminating the translucent portion of the housing or backlighting the display, electronics within the thermostat control the drive signals to the LED in order to operate the LED to provide the desired color. The invention also contemplates filtering the light and manually adjusting the filtering to provide the desired aesthetics.

17 Claims, 5 Drawing Sheets

U.S. PATENT DOCUMENTS

| | | | |
|---|---|---|---|
| 2005/0154496 | A1 | 7/2005 | Chapman, Jr. et al. |
| 2006/0016898 | A1 | 1/2006 | Ashworth |
| 2006/0060658 | A1 | 3/2006 | Proffitt et al. |
| 2006/0065510 | A1* | 3/2006 | Kiko et al. .................. 200/1 R |
| 2006/0186214 | A1 | 8/2006 | Simon et al. |
| 2007/0241203 | A1 | 10/2007 | Wagner et al. |
| 2008/0048046 | A1 | 2/2008 | Wagner et al. |

FOREIGN PATENT DOCUMENTS

| | | |
|---|---|---|
| EP | 0 564 127 | 10/1993 |
| GB | 07163397 | 8/2007 |
| JP | 59-145615 A | 8/1984 |
| JP | 2002-251903 A | 9/2002 |
| WO | WO 02/10847 | 2/2002 |

OTHER PUBLICATIONS

Article entitled: "*Lite Line Electroluminescent String!*" retrieved from http://www.talkingelectronics.com/Projects/Electroluminescence/LitELine01.html on May 4, 2006, (no stated date, but no later than applicant's filing date) (4 pages).

Product Description page entitled: "*L4034 4×40 LED Backlight LCD*" retrieved from http://www.eio.com/lcd4034.htm on Mar. 10, 2006, (Dec. 3, 2002) (3 pages).

Article entitled: "*Color, Light & Sound: Polarizing Filters*" retrieved from http://www.teachersource.com/catalog/page/Color_Light_Sound/Polarizing_Filters/?id=5dbe4eec694e011... on May 4, 2006, (no stated date, but no later than applicant's filing date) (4 pages).

Article entitled: "*Color, Light & Sound: Color Mixing LEDs*" retrieved from http://www.teachersource.com/catalog/catalogpage.html on May 4, 2006, (no stated date, but no later than applicant's filing date) (2 pages).

Article entitled: "*Molecular Expressions Microscopy Primer: Physics of Light and Color*" retrieved from http://www.micro.magnet.fsu.edu/primer/lightandcolor/index.html on Mar. 15, 2006, (last updated Aug. 23, 2005) (5 pages).

Article entitled: "*Molecular Expressions Optical Microscopy: Primer Specialized Techniques*" retrieved from http://www.micro.magnet.fsu.edu/primer/techniques/fluorescence/fluorhome.html on Mar. 15, 2006, (last updated Dec. 30, 2005) (7 pages).

Appellant's Reply Brief for U.S. Appl. No. 10/897,909 dated Dec. 14, 2007.

Examiner's Answer for U.S. Appl. No. 10/897,909 dated Oct. 18, 2007.

Appellant's Reply Brief for U.S. Appl. No. 10/897,909 dated Jun. 20, 2007.

Advisory Action for U.S. Appl. No. 10/897,909 dated Apr. 4, 2007.

Office Action for U.S. Appl. No. 10/897,909 dated Jan. 25, 2007.

Office Action for U.S. Appl. No. 10/897,909 dated Jul. 27, 2006.

Office Action for U.S. Appl. No. 11/509,281 dated Jan. 26, 2009.

Office Action for U.S. Appl. No. 11/404,588 dated Nov. 6, 2008.

Reply to Office Action of Nov. 6, 2008 for U.S. Appl. No. 11/404,588.

European Search Report, dated Jun. 30, 2009 for EP Application No. 07012725.

* cited by examiner

THERMOSTAT WITH ADJUSTABLE COLOR FOR AESTHETICS AND READABILITY

RELATED APPLICATIONS

This application is related to U.S. application Ser. No. 10/897,909, filed Jul. 23, 2004, which is hereby incorporated by reference in its entirety for everything that it teaches.

FIELD OF THE INVENTION

This invention relates to heating, ventilation and air conditioning (HVAC) systems, and more particularly to a thermostatic control unit, such as a wall mounted thermostat, or a temperature indicating device such as a thermometer, or other types of temperature responsive devices of the type used in HVAC systems.

BACKGROUND OF THE INVENTION

Most HVAC systems that provide temperature control of architectural spaces (e.g., a room) include thermostatic controllers or thermostats mounted on the walls of the spaces for sensing and controlling the temperatures of the spaces. Such thermostatic controllers typically include an internal temperature sensitive element for sensing the temperature of the space, an input element for receiving an input designating a desired temperature, and a dial or digital display of the thermostat's operating conditions. Usually the temperature sensing element is housed in the thermostat but it may also be external to the housing and remotely located. A typical controller or thermostat also includes output elements such as relays, switches, or electronic drive circuits for sending control signals to the HVAC system.

Sometimes, the mechanical or digital display of the thermostatic controller is illuminated so that the display is more easily read. Although illuminating the display facilitates operation of the thermostat, the relatively small size of the thermostat dictates correspondingly small text in the display, which often requires users to stand very close to the thermostat in order to read the displayed information.

Prior approaches to make the information in the displays more easily readable have often been at the expense of aesthetics. Permanently illuminated displays are distracting and are generally totally utilitarian in appearance. Moreover, having a lighted display with numerals and/or text big enough to be easily viewed by those with impaired vision is generally neither practical nor aesthetically pleasing. For example, large numerals and/or text require a large display, which requires a large housing. Since a thermostat is typically mounted to a wall in a room, the large housing compromises the aesthetics of the room's decorations.

BRIEF SUMMARY OF THE INVENTION

The invention provides a thermostat that both provides an easily readable display while at the same time presents an appearance that is aesthetically pleasing and complements the décor of the architectural space it controls. To accomplish this goal, the thermostat includes a housing having at least a portion thereof illuminated by a light that changes color via a manual input. The light illuminates the display for easy readability while at the same time the variable color of the light allows for a user to match the appearance of the thermostat to best complement the décor of the space whose temperature it controls.

In one embodiment, visual characteristics of light radiating outwardly from within a thermostat's housing are manually adjusted. Preferably, at least a portion of the housing is translucent to the light. User input elements provide for the manual adjustment of one or more characteristics of the light. Among the manually adjustable characteristics of the light radiating from the light source is visible color of the light.

Preferably, the light source comprises at least one light emitting diode (LED) for displaying a plurality of colors. In this case, to change the color of the light illuminating the translucent portion of the housing or backlighting the display, electronics within the thermostat control the drive signals to the LED in order to operate the LED to provide the desired color. In this regard, most LEDs today provide limited variable color and offer only a simple selection among red, green, and blue. However, in order to expand the available colors, the electronics of the thermostat can drive the LEDs differently to change the hue, brightness, and saturation of each of the red, green, and blue so as to provide virtually a full spectrum of possible colors. In addition to individually changing the hue, brightness, and saturation of each of the red, green, and blue LED elements, the electronics can simultaneously activate more than one color element in order to further expand the reproducible spectrum of colors.

Instead of controlling light emitted from light sources electronically, the invention also contemplates filtering the light and manually adjusting the filtering to provide the desired aesthetics. For example, a manually adjustable color wheel filter may cooperate with a light source of unchanging spectrum. Or a variable polarizing filter may cooperate with the light source.

Other aspects, objectives and advantages of the invention will be apparent from the following detailed description and the accompanying drawings.

BRIEF DESCRIPTION OF THE SEVERAL VIEWS OF THE DRAWING(S)

Figure 2:
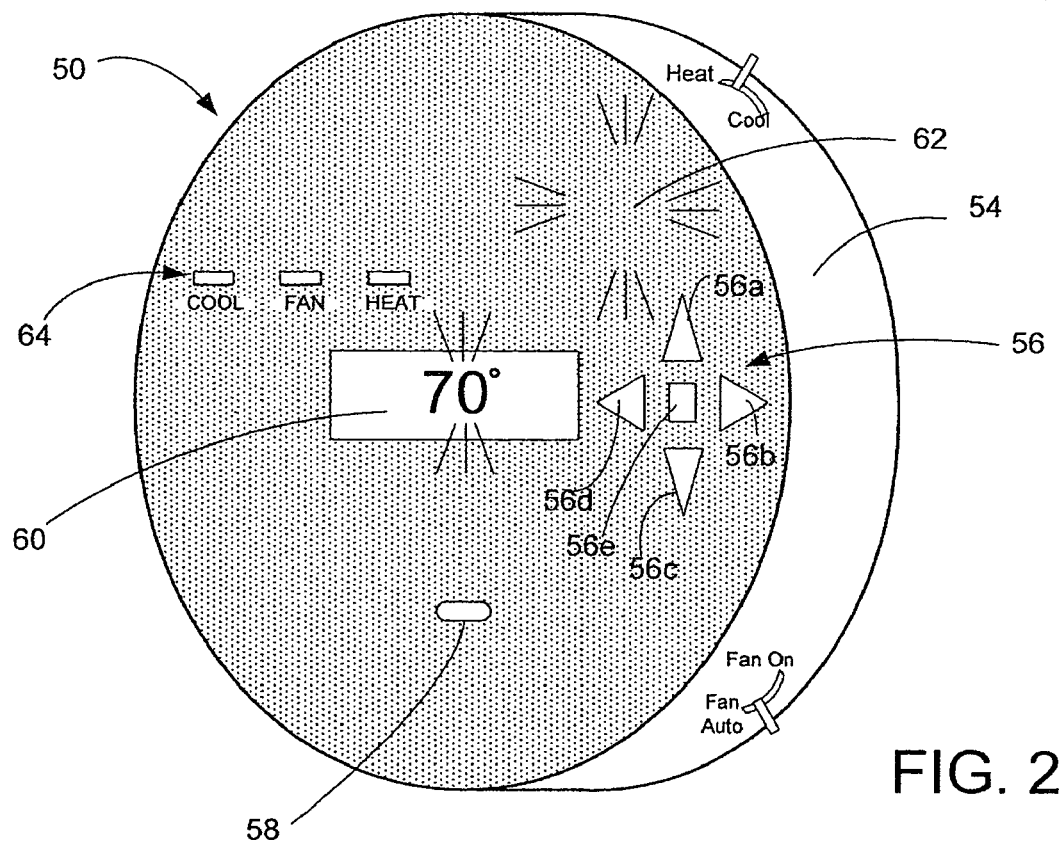
FIG. 2 is an exemplary embodiment of a thermostat having the features of the invention, where a partially translucent housing and a display are colored by variable lighting sourcing from a location internal to the thermostat.
Figure 9:
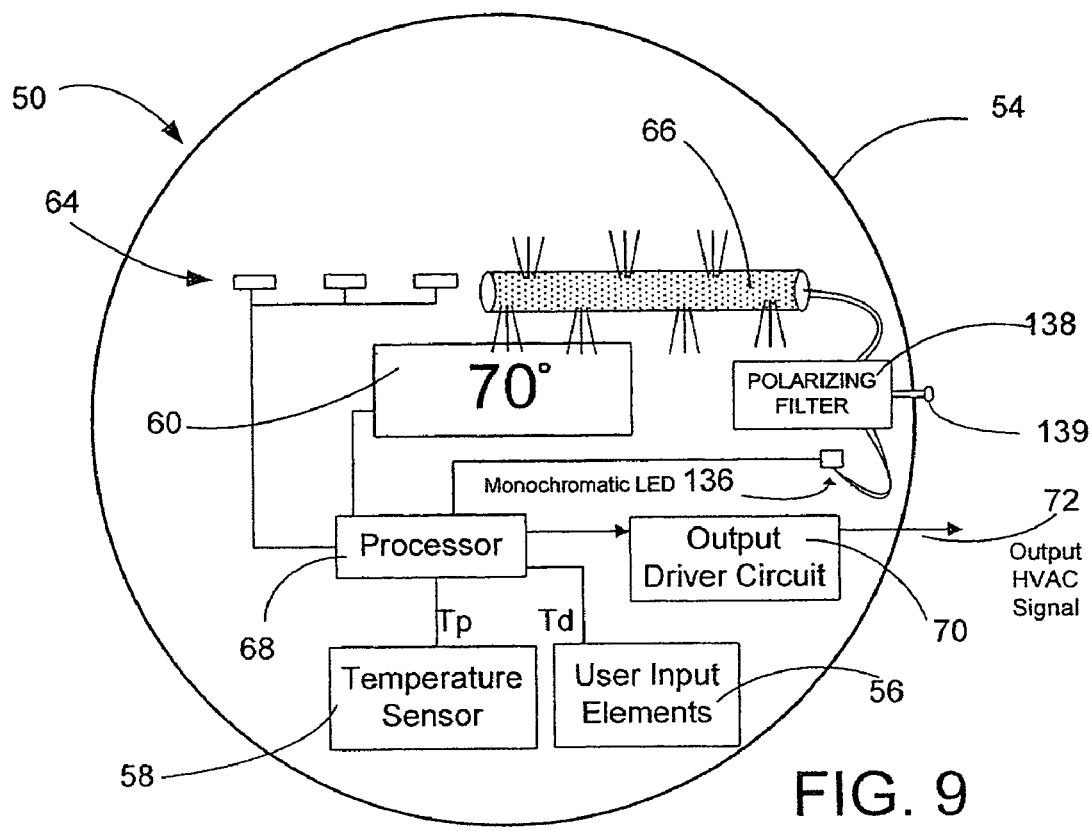
Figure 10:
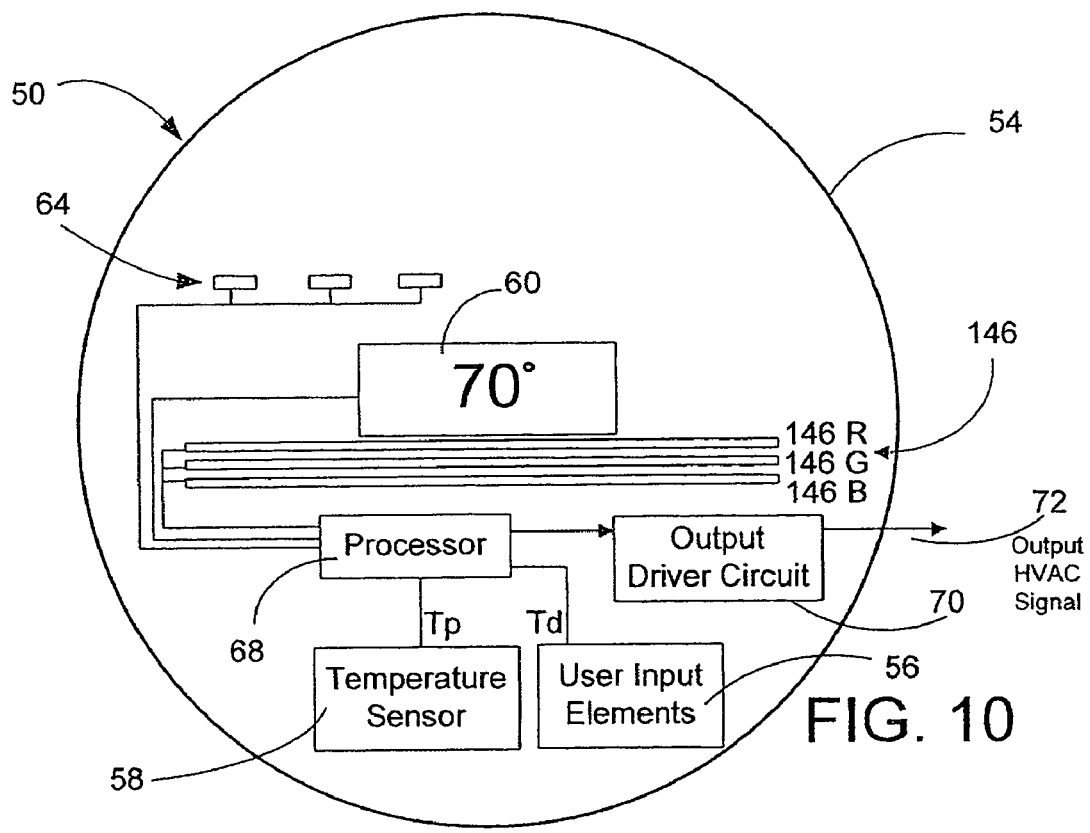

FIG. 9 is a schematic diagram of the internal space of a further embodiment of the thermostat shown in FIG. 2, illustrating a polarizing filter for adjusting the visible color of the light emitted by the source of light; and FIG. 10 is a schematic diagram of the internal space of another embodiment of the thermostat shown in FIG. 2 where the light source includes a plurality of electroluminescent tubes for displaying multiple colors.

DETAILED DESCRIPTION OF THE INVENTION

Figure 1:
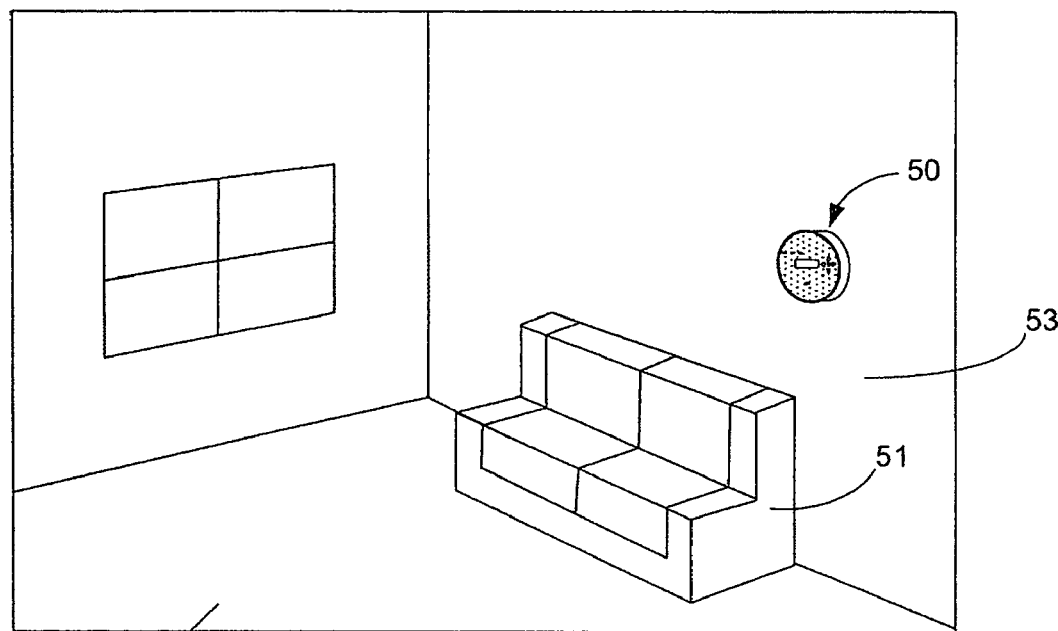
FIG. 1 illustrates an exemplary environment for a thermostat according to the invention.
Figure 3:
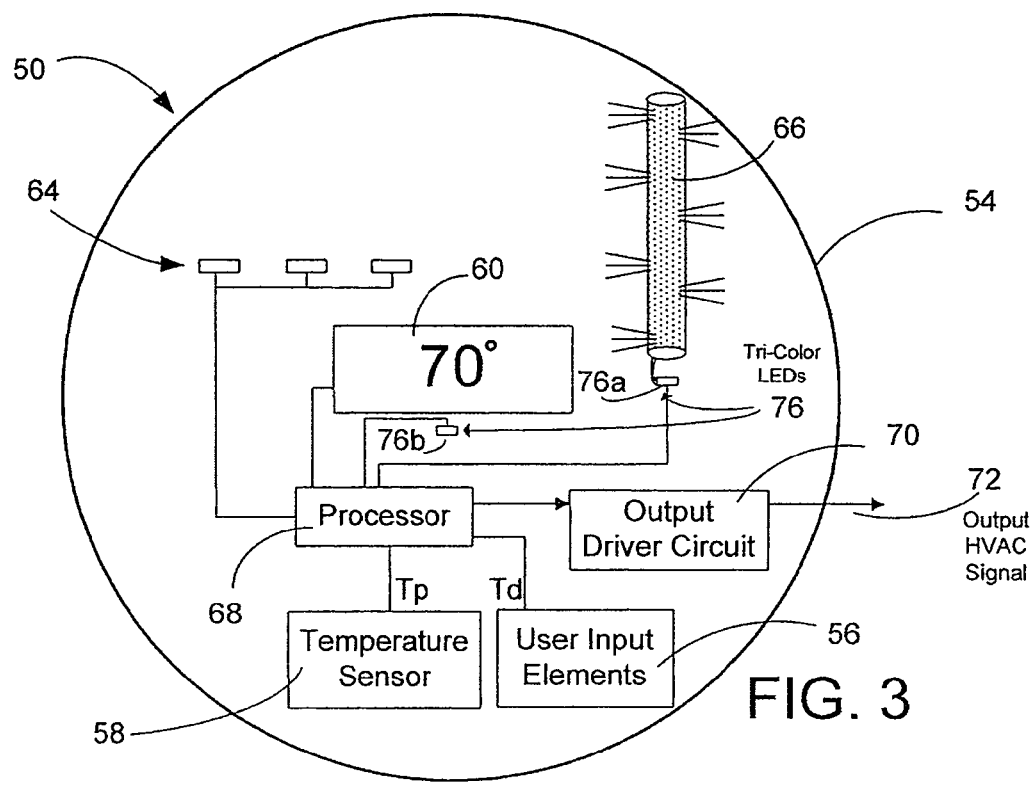
FIG. 3 is a schematic diagram of the internal space of an embodiment of the thermostat shown in FIG. 2, illustrating separate variable light sources illuminating the housing and backlighting the display.

FIGS. 1-3 show a first embodiment of a thermostat, according to the invention, in a form of a wall mounted thermostat 50. Referring to FIG. 2, the thermostat 50 includes a variable source of light 76 (FIG. 3) within a housing 54 with at least a portion 62 of the housing 54 being translucent to the light radiating outwardly from the light source 76 and illuminating at least the portion 62 of the housing 54. Alternatively, the entire housing 54 is translucent to the light emitted from its interior. As shown in FIG. 2, the thermostat 50 further includes a user input elements 56 for manually adjusting one or more characteristics of the light. The user input elements 56 are disposed within a housing 54 and, in this embodiment, comprise a plurality of buttons 56a, 56b, 56c, 56d, and 56e. In other embodiments, user input elements 56 include a touchpad, a touch screen, or other conventional user input devices and combinations thereof. The thermostat 50 further includes a display 60 for displaying the present and desired temperatures and graphic user interface options. Additionally, the thermostat 50 includes a plurality of status light emitting diodes (LEDs) 64 for displaying the active thermostat operating mode such as a heating, cooling, or a fan status mode illustrated in FIG. 2.

Referring to FIG. 3, to control the operation of the HVAC system, the processor 68 receives a desired temperature input Td from the user input elements 56. The temperature sensor 58, in turn, senses the present room temperature of the space and provides a signal Tp, indicative of the present room temperature, to the processor 68. The processor 68 compares the present room temperature to the desired room temperature, and causes the output driver circuit 70 to generate an output signal 72 for controlling a heating, ventilating and air conditioning system in a conventional manner. A suitable example of processor 68 is model ATMEGA 16 from Atmel. In further embodiments, a different processor may be used, such as one capable of receiving inputs indicative of the desired and present temperatures for controlling an HVAC system and having the capability of controlling the characteristics of at least one source of light via a manually adjustable user input.

Preferably, visible color of the light is among the manually adjustable characteristics of the light radiating from the light source 76. As illustrated in FIG. 1, when a thermostat is visible from a location which contains items of a user's décor, a user may wish to adjust the thermostat color in order to complement the colors within the room 52, such as those of a wall 53 or furniture 51, for example. Other manually adjustable characteristics of the light radiating from the light source 76 include duration of the light, such as whether the light is activated permanently or only temporarily, as well as the overall intensity of the light to accommodate for various ambient lighting conditions.

As further shown in FIG. 3, the thermostat 50 comprises a source of light 76 for generating a light inside the thermostat 50. Preferably, the light source 76 comprises at least one light emitting diode for displaying a plurality of colors. In this embodiment, the light source 76 includes two separate variable light sources comprising LEDs 76a and 76b that, respectively, illuminate the housing 54 and backlight the display 60. Referring again to FIG. 3, the thermostat 50 also includes a light pipe 66 connected to the light source 76a for distributing the light emitted by the LED 76a throughout the housing 54 and thus illuminating the translucent portion 62.

The LEDs 76a and 76b are tri-color LEDs capable of emitting multiple colors, such as red, blue, and green from a single enclosure. Suitable examples of tri-color LEDs are models M500RGB4D from Lighting Components LED Corporation and RL5-RGB from Super Bright LEDs, Inc. However, it should be recognized by a person skilled in the art that other embodiments may include different tri-color, bi-color, or other multi-color LEDs having the capability of emitting multiple colors from a single LED enclosure. Alternatively, in another embodiment, shown in FIG. 4, the light source 86 includes two separate light sources 86a and 86b, wherein each light source 86a, 86b is comprised of a bank of discrete color LEDs selected for their opposing hues, such as red, green, and blue. Suitable examples of discrete color LEDs are models RL5-R3545, RL5-G8045, and RL5-B2545 from Super Bright LEDs, Inc.

To adjust the characteristics of the light emitted by the light sources 76a, 76b (FIG. 3) and 86a, 86b (FIG. 4), a user preferably provides the desired characteristic to the processor 68 through the user input elements 56 by choosing the corresponding option within the processor's 68 graphic user interface presented on the display 60. When the desired characteristic is color of the light illuminating the translucent portion 62 or backlighting the display 60, the processor 68 activates the appropriate color within the multi-color LEDs 76a, 76b or discrete LED banks 86a, 86b. In order to expand the color choices from the basic red, green, and blue, the processor 68 is capable of providing a virtually full spectrum of colors by simultaneously activating more than one color element, while individually changing the hue, brightness, and saturation of the activated color elements within each tri-color LED 76a, 76b or discrete LED banks 86a, 86b.

Figure 4:
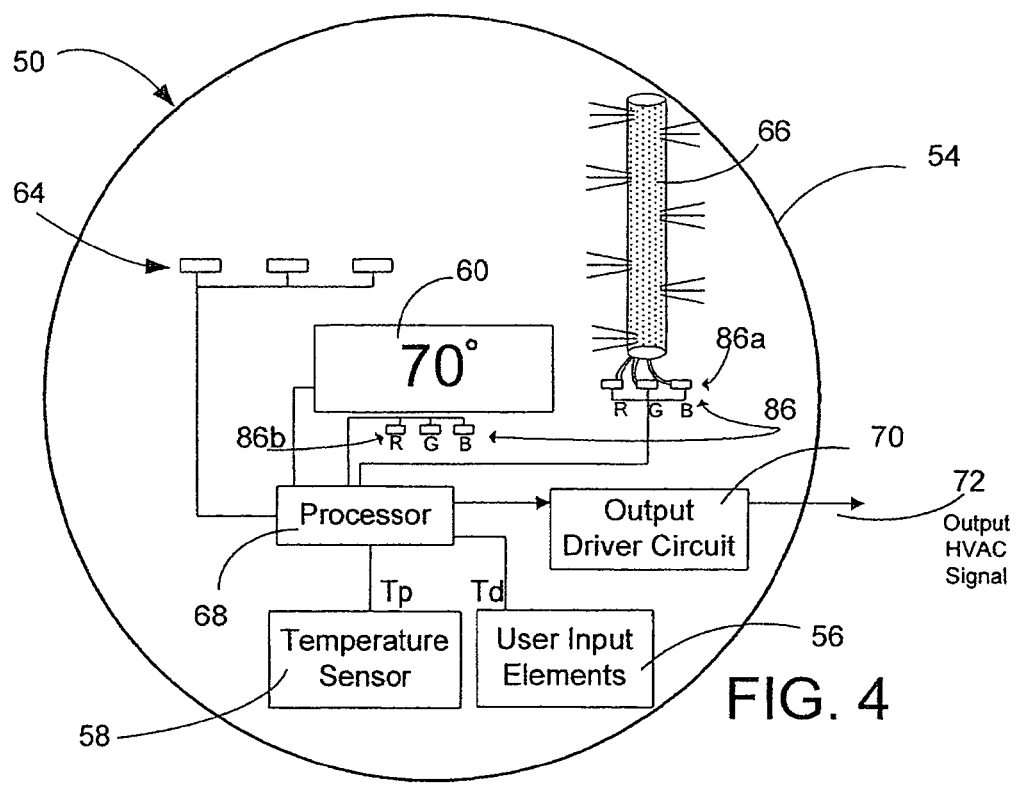
FIG. 4 is a schematic diagram of the internal space of an embodiment of the thermostat shown in FIG. 2, illustrating separate variable light sources illuminating the housing and backlighting the display as in FIG. 3 but where the light sources include banks of discrete color LEDs.
Figure 5:
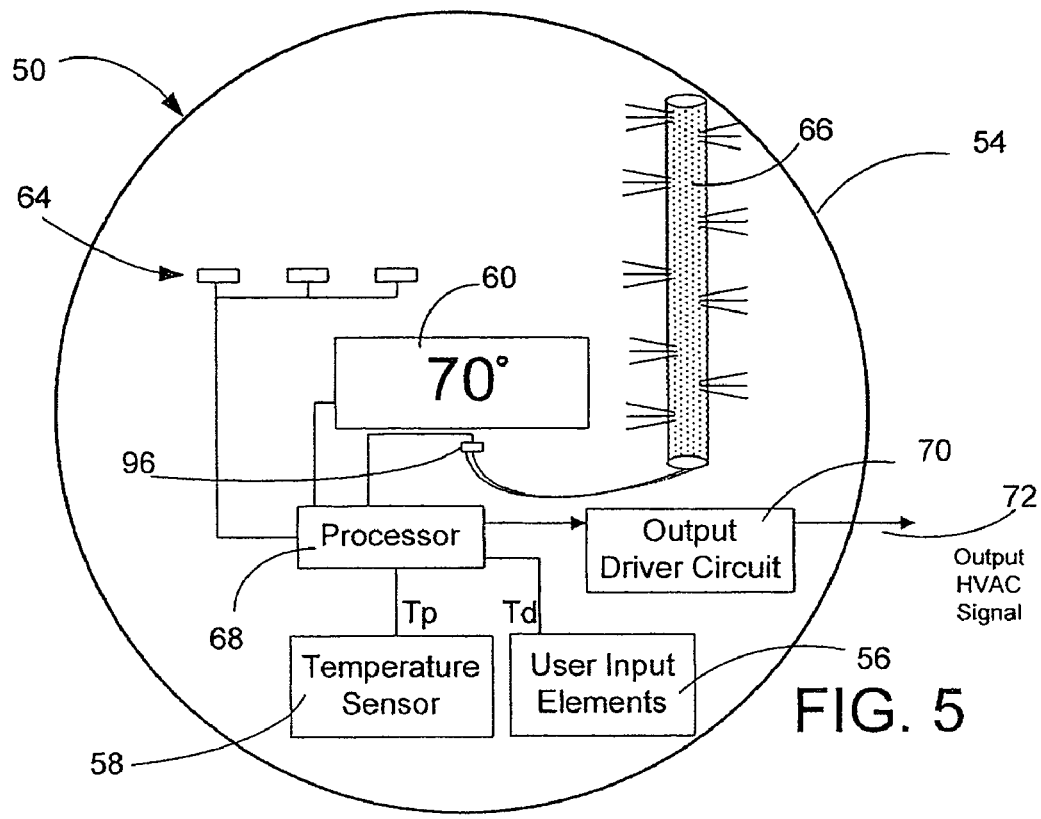
FIG. 5 is a schematic diagram of the internal space of another embodiment of the thermostat shown in FIG. 2, illustrating a common variable light source illuminating both the display and the housing.
Figure 6:
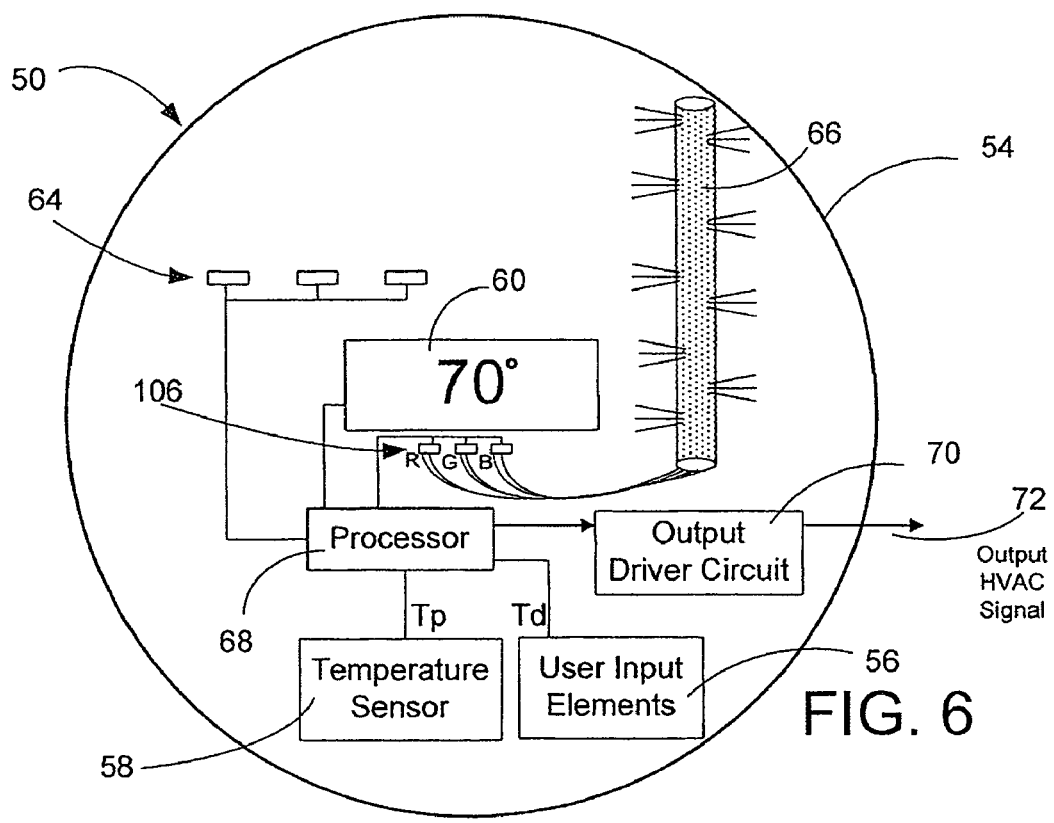
FIG. 6 is a schematic diagram of the internal space of an embodiment of the thermostat shown in FIG. 2, illustrating a common variable light source illuminating both the display and the housing as in FIG. 5 but where the light source includes a bank of discrete color LEDs.

In the embodiments illustrated in FIGS. 3, 4, a user has separate control over the color of the backlighting and illumination of the translucent portion 62 of the housing 54 because the thermostat 50 includes separate variable light sources 76a, 76b (FIG. 3) and 86a, 86b (FIG. 4). Other embodiments, as illustrated by FIGS. 5 and 6, for example, include a single light source providing the source of light for both backlighting the display 60 and illuminating the housing 54 through connection to the light pipe 66. As illustrated in FIG. 5, the light source 96 includes a single multi-color LED capable of emitting a plurality of colors from a single enclosure. Alternatively, as shown in FIG. 6, the light source 106 includes a bank of three discrete LEDs selected for their opposing hues and connected in parallel to the light pipe 66. Thus, in FIGS. 5 and 6, a user's selection of the desired characteristic of the light via user input elements 56 adjusts the corresponding characteristic of both the backlight for the display 60 and the light passing through the housing 54.

Figure 7:
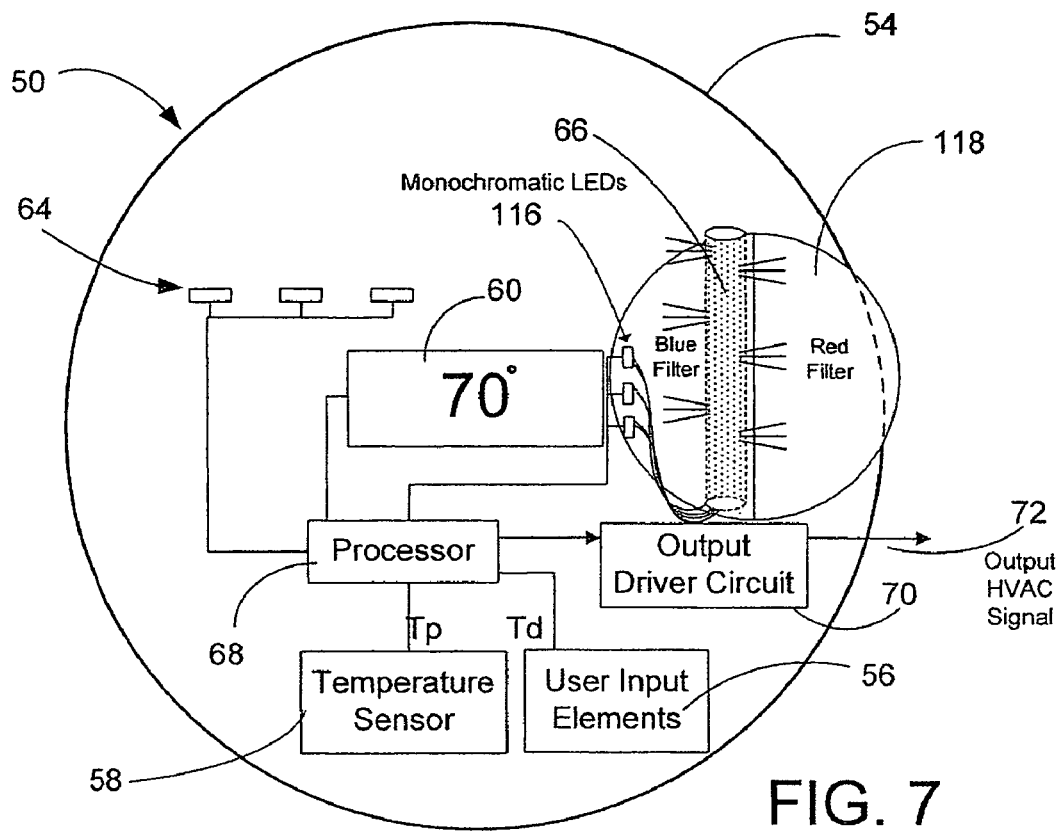
FIG. 7 is schematic diagram of the internal space of yet another embodiment of the thermostat shown in FIG. 2, illustrating a variable color filter for varying the characteristics of a light source in the thermostat and a light pipe for distributing the light from the source of light throughout at least a portion of the housing.
Figure 8:
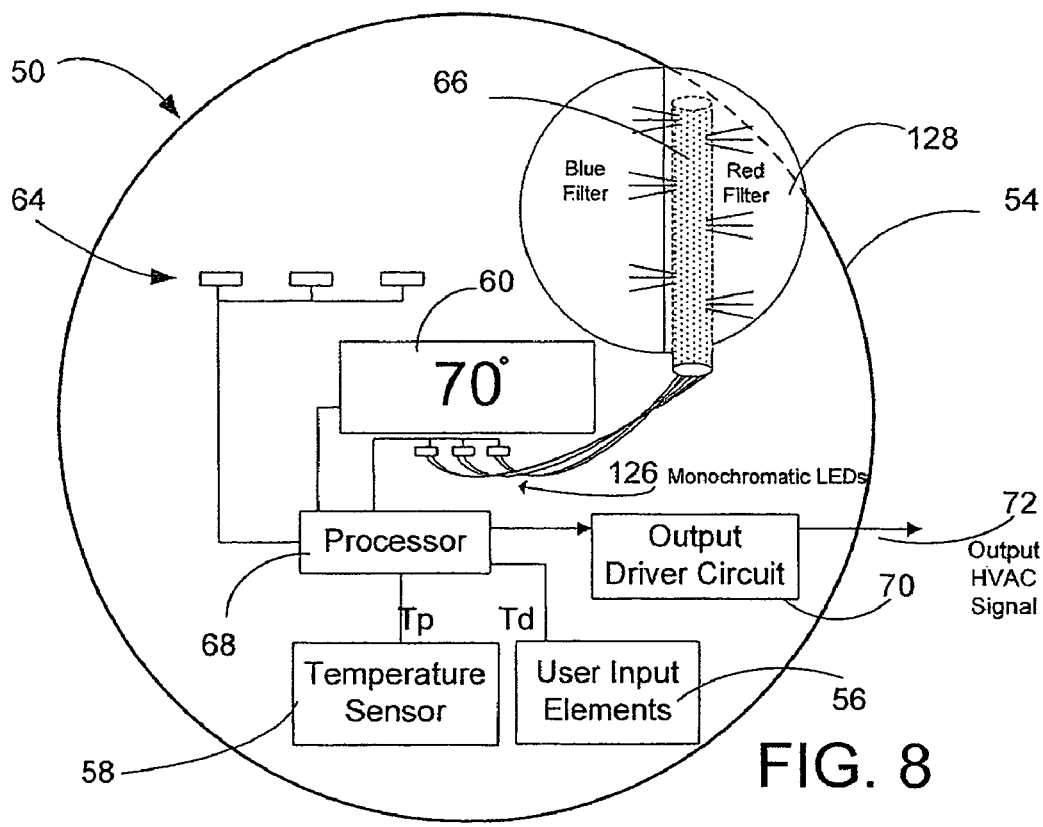
FIG. 8 is schematic diagram of the internal space of still another embodiment of the thermostat shown in FIG. 2, illustrating a variable color filter and a light pipe as in FIG. 7 but with the color filter adjusting only the color of the light emitted from the light pipe.

Additional embodiments depicted in FIGS. 7-10 illustrate alternate ways of providing the desired aesthetics by manually adjusting the color of the light emitted by the light sources 116 (FIG. 7), 126 (FIG. 8), 136 (FIG. 9), and 146 (FIG. 10). For example, in FIGS. 7 and 8, light sources 116, 126 comprise a bank of single color, or monochromatic, LEDs which do not have color changing capability. Hence, a color wheel is used to filter the light from the light sources 116, 126 in order to manually adjust the color of the light illuminating the housing 54 (FIG. 8) and, optionally, the color of the light backlighting the display 60 (FIG. 7). The color wheel filters of FIGS. 7, 8 include a plastic translucent material divided into a plurality of segments comprised of multiple colors. When it is desired to adjust the color of the observed light, a user manually turns the portion of the color wheel 118, 128, which is accessible from an external surface of the housing 54, until the desired colored segment of the color wheel 118, 128 covers the light source 116, 126.

In yet another embodiment, illustrated in FIG. 9, the color of the light emitted by a monochromatic light source 136 is changed by passing through a variable polarizing filter 138. The polarizing filter 138 includes material, such as calcite, exhibiting birefringence qualities and being disposed between two polarizing elements to produce a color shift of the light originating from the light source 136. The user adjusts the color of the light by manually varying the relative positions of the polarizing elements via a lever 139. The lever 139 is accessible from an external surface of the housing 54.

In a further embodiment, shown in FIG. 10, the light source 146 includes a plurality of electroluminescent light sources, such as electroluminescent tubes 146R, 146G, 146B, for example, wherein the colors of sources 146R, 146G, 146B are selected for their opposing hues. In this embodiment, as in FIGS. 3-6, the user adjusts the color of the light emitted by the light source 146 by providing the desired color characteristic to the processor 68 through the user input elements 56. The processor 68, in turn, activates the appropriate light source 146R, 146G, and 146B, either individually or simultaneously, while individually changing the hue, brightness, and saturation of each activated light source 146R, 146G, and 146B.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A thermostat for controlling an HVAC system, the thermostat comprising:
   a housing;
   a controller for adjusting an operating mode of the HVAC system to one of a cooling mode and a heating mode;
   a source of light associated with the housing for illuminating the housing with a color of the light;
   a manually adjustable input for selecting a desired color of the light; and
   means responsive to the manually adjustable input for modifying the color of the light to the desired color, independent of the operating mode of the HVAC system.

2. The thermostat of claim 1 wherein the manually adjustable input selects one or more of the light's hue, brightness, and saturation.

3. The thermostat of claim 1 wherein the means includes circuitry for selecting the desired color.

4. The thermostat of claim 1 wherein the means includes a filter for filtering the light from the light source.

5. The thermostat of claim 4 wherein the filter is one of a polarizing filter and a variable color filter.

6. The thermostat of claim 1 wherein the source of light includes one of an electroluminescent source and at least one LED for displaying a plurality of colors.

7. The thermostat of claim 1 wherein the housing is translucent to the light.

8. The thermostat of claim 1 further including a display backlit by the light.

9. The thermostat of claim 8 wherein the housing is translucent to the light.

10. The thermostat of claim 9 wherein the manually adjustable input controls the desired color of the light comprising both a light for the backlight for the display and a light passing through the housing.

11. A method of modifying a visual appearance of an HVAC thermostat comprising:
    generating a light from inside the thermostat, the light having an adjustable color that is visible to an observer of the thermostat; and
    manually adjusting the color of the light perceived by the observer to a desired color, wherein the adjustment is independent of an operating mode of the thermostat, the operating mode of the thermostat comprising one of a cooling mode and a heating mode.

12. The method of claim 11 wherein the light includes light backlighting a display.

13. The method of claim 11 wherein the light includes light passing through a semi-transparent area of a housing.

14. A thermostat for sensing ambient temperatures in an enclosed space and for controlling an HVAC system, the thermostat comprising:
    a display;
    a housing for the display;

a controller for adjusting an operating mode of the HVAC system, the operating mode of the HVAC system comprising one of a cooling mode and a heating mode;

a source of light within the housing for generating a light having an adjustable color, wherein the light is visible to an observer of the display who is external to the display and the thermostat; and an element for manually adjusting the color of the light to complement at least one color of the enclosed space, where the adjustment is independent of the operating status of the HVAC system.

15. The thermostat of claim 14 wherein the element manually adjusts one or more of the light's hue, brightness, and saturation.

16. The thermostat of claim 14 wherein the element includes circuitry for changing the color of the light.

17. The thermostat of claim 14 wherein the element includes one of a variable color filter and a polarizing filter for filtering the light from the light source.

* * * * *